United States Patent
Lee

(10) Patent No.: US 6,658,961 B2
(45) Date of Patent: Dec. 9, 2003

(54) SHIFT MANIPULATING APPARATUS OF AUTOMATIC TRANSMISSION

(75) Inventor: Chang-Wook Lee, Yongin (KR)

(73) Assignee: Hyundai Motor Company, Seoul (KR)

( * ) Notice: Subject to any disclaimer, the term of this patent is extended or adjusted under 35 U.S.C. 154(b) by 27 days.

(21) Appl. No.: 10/027,483

(22) Filed: Dec. 19, 2001

(65) Prior Publication Data

US 2002/0086757 A1 Jul. 4, 2002

(30) Foreign Application Priority Data

Dec. 28, 2000 (KR) ........................................ 2000-84346

(51) Int. Cl.$^7$ ................................................ G05G 9/00
(52) U.S. Cl. .................. 74/473.3; 74/473.1; 74/473.11
(58) Field of Search ............................. 74/335, 473.11, 74/473.1, 473.3, 473.36, 473.26; 475/131

(56) References Cited

U.S. PATENT DOCUMENTS

| | | | |
|---|---|---|---|
| 2,400,663 A | * | 5/1946 | Derungs ...................... 19/237 |
| 3,882,738 A | | 5/1975 | Audiffred, Jr. et al. |
| 4,290,325 A | | 9/1981 | Nishimura |
| 4,856,381 A | | 8/1989 | Funahashi et al. |
| 5,042,316 A | * | 8/1991 | Gressett, Jr. ................ 74/473.1 |
| 5,050,459 A | | 9/1991 | Ishikawa et al. |
| 5,205,180 A | * | 4/1993 | Moroto et al. ........... 74/473.11 |
| 5,224,399 A | | 7/1993 | Baba et al. |
| 5,337,625 A | | 8/1994 | Jang |
| 5,537,877 A | | 7/1996 | Hsu |
| 5,682,789 A | * | 11/1997 | DeCrouppe et al. .......... 74/335 |
| 5,921,888 A | | 7/1999 | Park |
| 6,205,390 B1 | * | 3/2001 | Holbrook et al. ............. 701/62 |

* cited by examiner

Primary Examiner—Charles A. Marmor
Assistant Examiner—Dennis Abdelnour
(74) Attorney, Agent, or Firm—Pennie & Edmonds

(57) ABSTRACT

A shift manipulating apparatus for an automatic transmission is disclosed that transmits manipulating force from a shift lever to a manual valve to position the spool of a manual valve at identical places in ranges P and N. The apparatus comprises a shift lever to receive shift range selection manipulating force of a driver; a manual valve to control oil pressure of the automatic transmission; and a linkage unit for connecting the shift lever and the spool of the manual valve to enable the spool to identically form an interconnection state of ports according to pivot of the shift lever in ranges P and N.

10 Claims, 4 Drawing Sheets

SHIFT MANIPULATING APPARATUS OF AUTOMATIC TRANSMISSION

BACKGROUND OF THE INVENTION

The present invention relates to a shift manipulating apparatus for an automatic transmission, and more particularly, to a shift manipulating apparatus for an automatic transmission that can move the spool of a manual valve to identical positions for the range shifts to park or neutral, thereby simplifying the structure of the oil pressure control unit.

In general, a vehicle having an automatic transmission, as shown in FIG. 1, includes a shift lever 10, pivotally installed inside for a driver to select a running mode, and a manual valve 12. Manual valve 12 is a shifting valve that selectively transmits oil pressure to a clutch or brake of the transmission in response to gear changes via movement of the shift lever 10 by the drive. A position control apparatus 14 is installed between the shift lever 10 and manual valve 12 to transmit to the manual valve 12 the shift manipulating force generated by pivot of the shift lever 10. The position control apparatus 14 typically further includes a cable 14a connected with the shift lever 10, an inhibiter switch assembly 14b connected to the cable 14a and pivotally installed at the transmission and a rod 14c connected to the inhibiter switch assembly 14b for transmitting the shift manipulating force to the manual valve 12.

Thus, when the shift lever 10 pivots along a sequence of ranges P-R-N-D-3-2-L when the gear range is shifted, valve spool 12a moves in a straight line at a predetermined rate via the position control apparatus 14. This positions the valve spool relative to the port or ports corresponding to the selected gear range, thereby applying line pressure to a relevant transmission frictional element.

In other words, pivot movement of the shift lever 10 is converted into a straight line movement when passing through the cable 14a of the position control apparatus 14. Then, the straight line movement of the cable 14a is converted into pivot movement again when passing through the inhibiter switch assembly 14b. At last, the pivot movement of the inhibiter switch assembly 14b is converted into a straight line movement again when passing through rod 14c. As a result, a relevant port is opened by movement of valve spool 12a thereby applying line pressure to a relevant frictional element for completion of a shift.

However, there is a problem in the conventional manual valve manipulating apparatus in that there is a difference only in the mechanical operation relative to motion of a parking brake apparatus at ranges P and N, but no difference in the oil pressure control unit of the automatic transmission. In other words, it is necessary to transmit oil pressure to a relevant clutch or brake for ranges R-D-3-2-L of running modes of a vehicle. However, at ranges P and N, where the vehicle is stopped, the manual valve functions to maintain a predetermined level of oil pressure only to lubricate respective elements of a power train and to prevent the oil pressure from being transmitted to clutches or brake. Therefore, it is not meaningful to differentiate ranges P and N in the oil pressure control unit.

Nevertheless, there are problems in the conventional manual valve manipulating apparatus in that the position of the spool 12a is not identical at ranges P and N because the manual valve 12 performs only a simple straight line movement along with pivot movement of the shift lever 10, and that the oil pressure control unit of the valve body is constructed in a complex structure to make identical the switches of an oil path in the two ranges where the spool is differently positioned.

SUMMARY OF THE INVENTION

The present invention provides a shift manipulating apparatus for an automatic transmission that can simplify the structure of an oil pressure control unit by modifying the position control apparatus such that the spool of the transmission manual valve is positioned at identical places in ranges P and N.

Preferably the shift manipulating apparatus comprises a shift lever to receive shift range selection manipulating force, a manual valve to control oil pressure in the automatic transmission, and a linkage connecting the shift lever and valve spool to enable the spool to be identically positioned in ranges P and N according to pivot of the shift lever.

According to a further alternative embodiment of the present invention a shift manipulating apparatus is provided for an automatic transmission that includes at least drive, reverse, neutral and park gear ranges (D, R, N and P). The invention thus comprises a gear shift mechanism cooperating with a manual hydraulic valve, wherein the manual valve includes identical hydraulic port positions for both the neutral and park gear ranges. Preferably, the gear shift mechanism comprises a gear shift lever and three linkage members operatively linking the lever to the manual valve. More specifically, a first linkage member has a first end operatively linked to the shift lever, and a second end. A second linkage member has a first end that is operatively linked to the first linkage member second end at a first connection point. The third linkage member has a first end operatively linked to the second linkage member second end at a second connection point and a second end operatively linked to the manual valve. The first connection point is guided to be equally spaced from the manual valve in both the neutral and park gear ranges. In a further preferred embodiment, the first connection point, in the reverse gear range, is guided to a position between the neutral and park gear ranges and spaced closer to the manual valve than in the neutral or park gear ranges.

More preferably, the manual valve comprises a valve body defining the hydraulic ports and a valve spool movable within said body to select ports corresponding to the selected gear range. As such, the third linkage member is linked to the valve spool and the second connection point is guided to move at least substantially parallel to movement of the valve spool. A guide member may be provided having a first channel carrying the first connection point and a second channel carrying the second connection point. The first channel is preferably at least substantially perpendicular to said second channel and includes a raised portion corresponding to the reverse gear range position. The raised portion positions the first connection point closer to the manual valve than when in the park or neutral gear range positions.

In an another embodiment of the invention a manual valve for an automatic transmission is provided. The valve includes a valve body and a valve spool. The valve body defines a plurality of hydraulic ports corresponding to at least drive, reverse, neutral and park gear ranges of the transmission. The valve spool is movable within said body to select between the various hydraulic ports. The valve body is configured such that the valve spool selects the same ports for both the neutral and park gear ranges.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Figure 1:
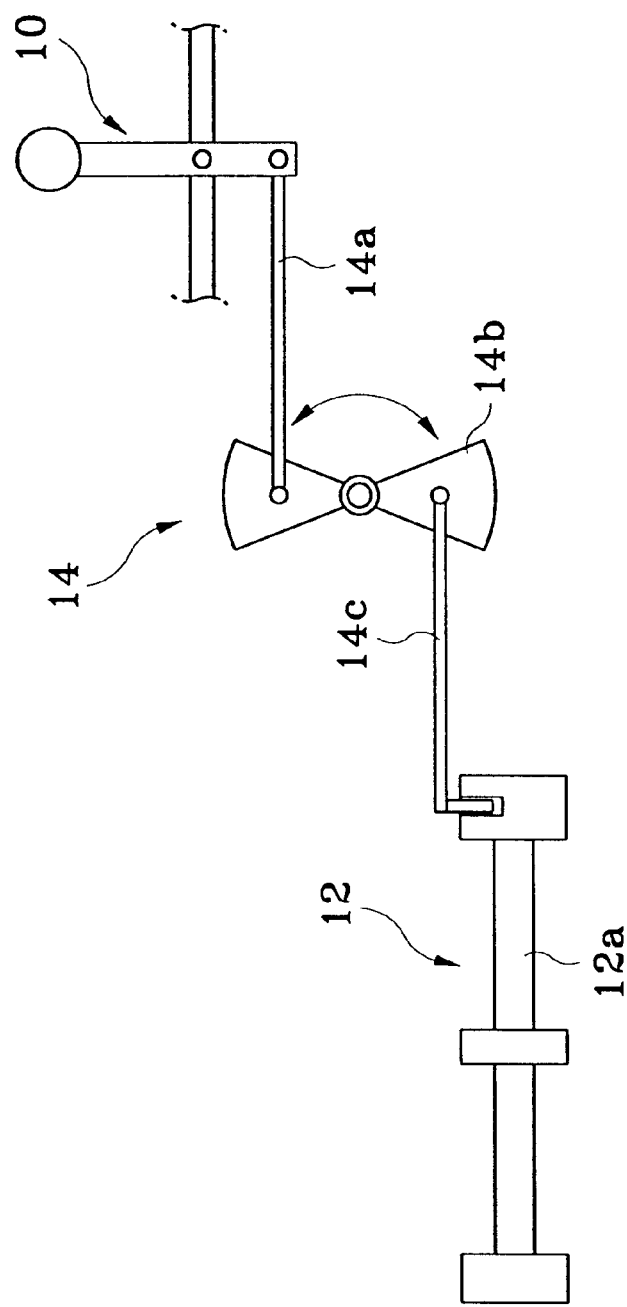
FIG. 1 is a schematic view of a conventional shift manipulating apparatus of an automatic transmission.

Hereinafter, preferred embodiments of the present invention will be described in detail with reference to accompanying drawings. Where appropriate, the same reference numerals are used for designation of equivalent parts or portions as shown in the conventional shift manipulating apparatus of an automatic transmission of FIG. 1.

As shown in the drawings of the present invention, a shift manipulating apparatus of an automatic transmission is constructed with a shift lever 10 pivotally installed inside to make a straight line movement possible according to a driver's manipulation. Manual valve 12 including a valve body to selectively provide operational pressure to a clutch or a brake to be controlled, cooperates with shift lever 10 through linkage means 14. Linkage means 14 enables positioning of spool 12a to an identical position when shift lever 10 is respectively shifted to ranges P or N.

Linkage means 14 includes a first rod 16 connected to the shift lever 10, a third rod 20 connected to the spool 12a of the manual valve 12, a second rod 18 pivotally interconnecting the first and third rods 16, 20, a first guide 22-1 for guiding a connection point (X) of the second and third rods 18, 20 along a straight line movement in parallel with the spool 12a, and a second guide 22-2 for guiding the connection point (Y) of the first and second rods 16, 18 to the same spacing from manual valve 12 in both the P and N ranges.

In other words, if the shift lever 10 is pivoted at the time of a gear range shift, the linkage means 14 cooperates therewith to enable the rods to respectively move in a straight line along the vertical and horizontal directions, thereby positioning spool 12a in the same position when shifted to either range P or N. As a result, the communication state of the ports of the manual valve 12 can be identical for ranges P and N.

The first and second guides 22-1, 22-2 preferably include a protruder 22a to guide the connection point of the first and second rods 16, 18 to enable the spool 12a to be positioned at the leftmost position when the shift lever 10 is positioned in the R range. The protruder 22a enables the connection point (Y) of the first and second rods 16, 18 to be moved to symmetrical positions centered around the protruder 22a at ranges P or N. As a result, the spool 12a of the manual valve 12 starts at range R, moves to the same position for either range P or N, and sequentially appropriate positions according to ranges D-3-2-L.

The first and second guides 22-1, 22-2 restrict the rod connection points to movement along straight line directions in response to the pivot of the shift lever 10 at the time of range shifts, within a predetermined movement path. If there is no obstacle in the movement path of all rods, the first and second guides 22-1, 22-2 can be made in any shape. In a preferred embodiment of the present invention, the first and second guides 22-1, 22-2 are made in an integrated shape of the letter "T".

A plurality of ports are formed in manual valve 12 to supply line pressure for control of the various gear ranges. For example, input port 12b receives operational oil at line pressure from a regulator valve through an oil pump. Supply port 12c supplies line pressure to a related frictional element at range R. Supply port 12d supplies line pressure to a related frictional element at any other range than range R. Supply port 12e supplies line pressure to another related frictional element at range D. A further supply port 12f supplies line pressure to a related frictional element at range 3. Another supply port 12g supplies line pressure to a related frictional element at range 2. Finally, supply port 12h supplies line pressure to a related frictional element at range L. In order to supply line pressure to related frictional elements at related ranges at the time of range shifts, spool 12a of the manual valve 12 includes first and second land parts 12i, 12j for communicating between related ports.

Figure 2:
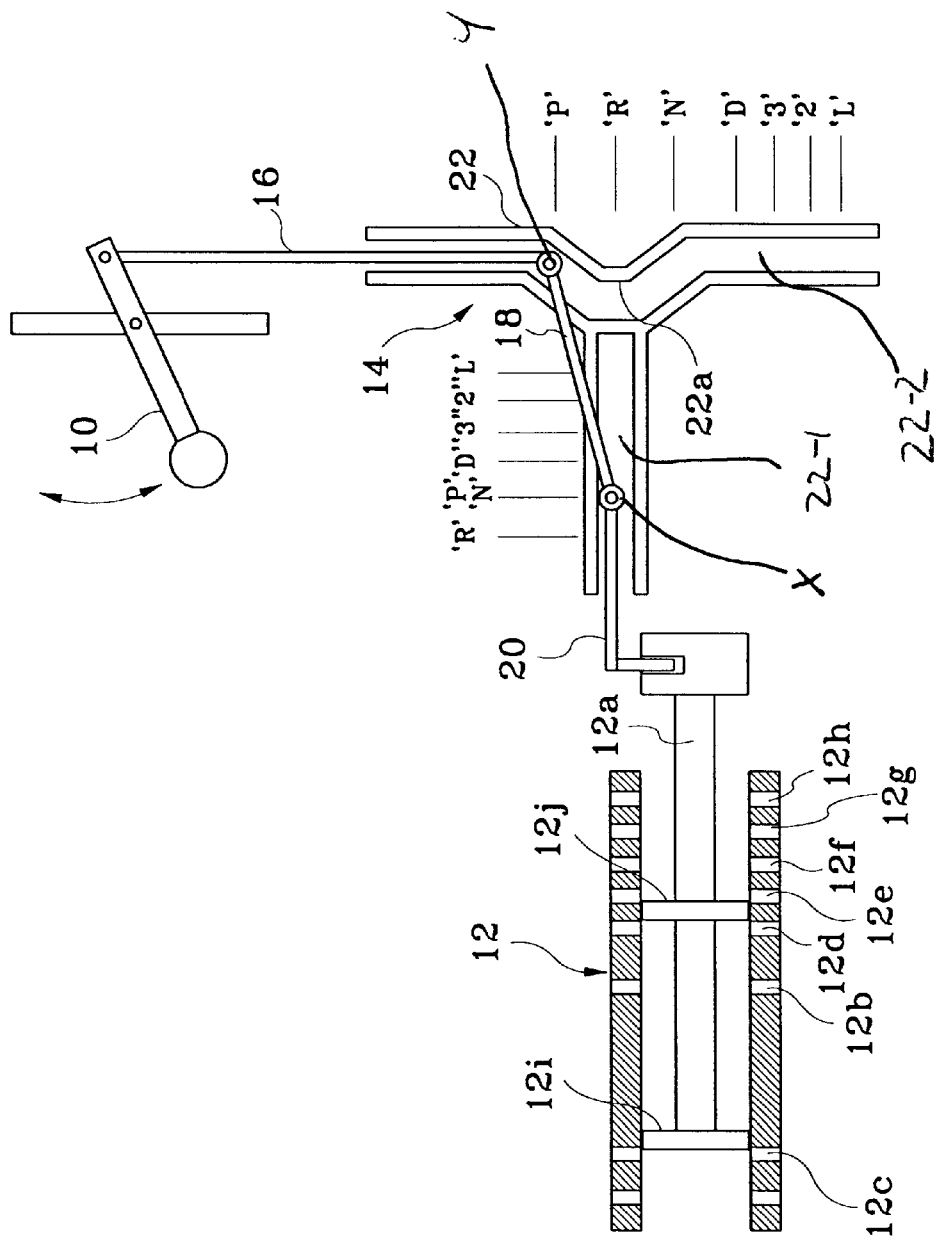
FIG. 2 is a schematic view of a shift manipulating apparatus of an automatic transmission, illustrating a state where a shift lever is positioned at range P, in accordance with the present invention.

Therefore, in the shift manipulating apparatus according to the present invention, when the shift range is shifted to range P, the first rod 16 of the linkage means 14 is pulled upward according to the pivot of shift lever 10, the second rod 18, connected to the first rod 16, is pulled to the right, and the third rod 20, connected to the second rod 18, pulls the spool 12a to the right, thereby communicating the ports for the P range oil path as shown in FIG. 2. In other words, the first and second land parts 12i, 12j interconnect input port 12b and supply port 12d that supplies line pressure to a related frictional element at any other range than range R, i.e, P or N.

Figure 3:
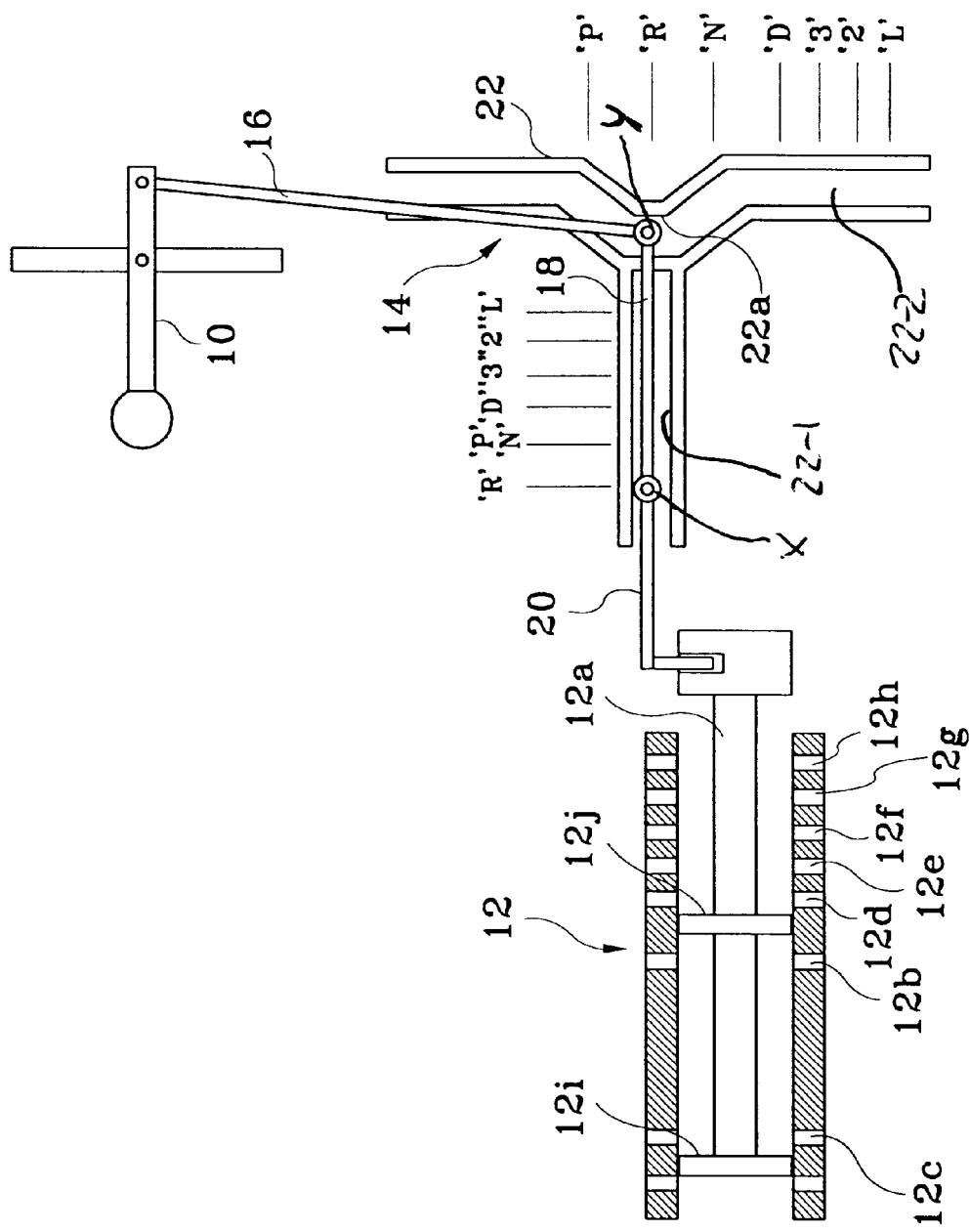
FIG. 3 is a schematic view of a shift manipulating apparatus of an automatic transmission, illustrating a state where a shift lever is positioned at range R, in accordance with the present invention.

As shown in FIG. 3, when the shift lever is positioned at range R, the first rod 16 is pushed downward, the second rod 18, connected to the first rod 16, is pushed to the left, the third rod 20, connected to the second 18, pushes spool 12a to the left, thereby completing interconnection of ports for the oil path for range R. In other words, first and second land parts 12i, 12j interconnect the input port 12b and the supply port 12c that supplies line pressure to a related frictional element at range R.

Figure 4:
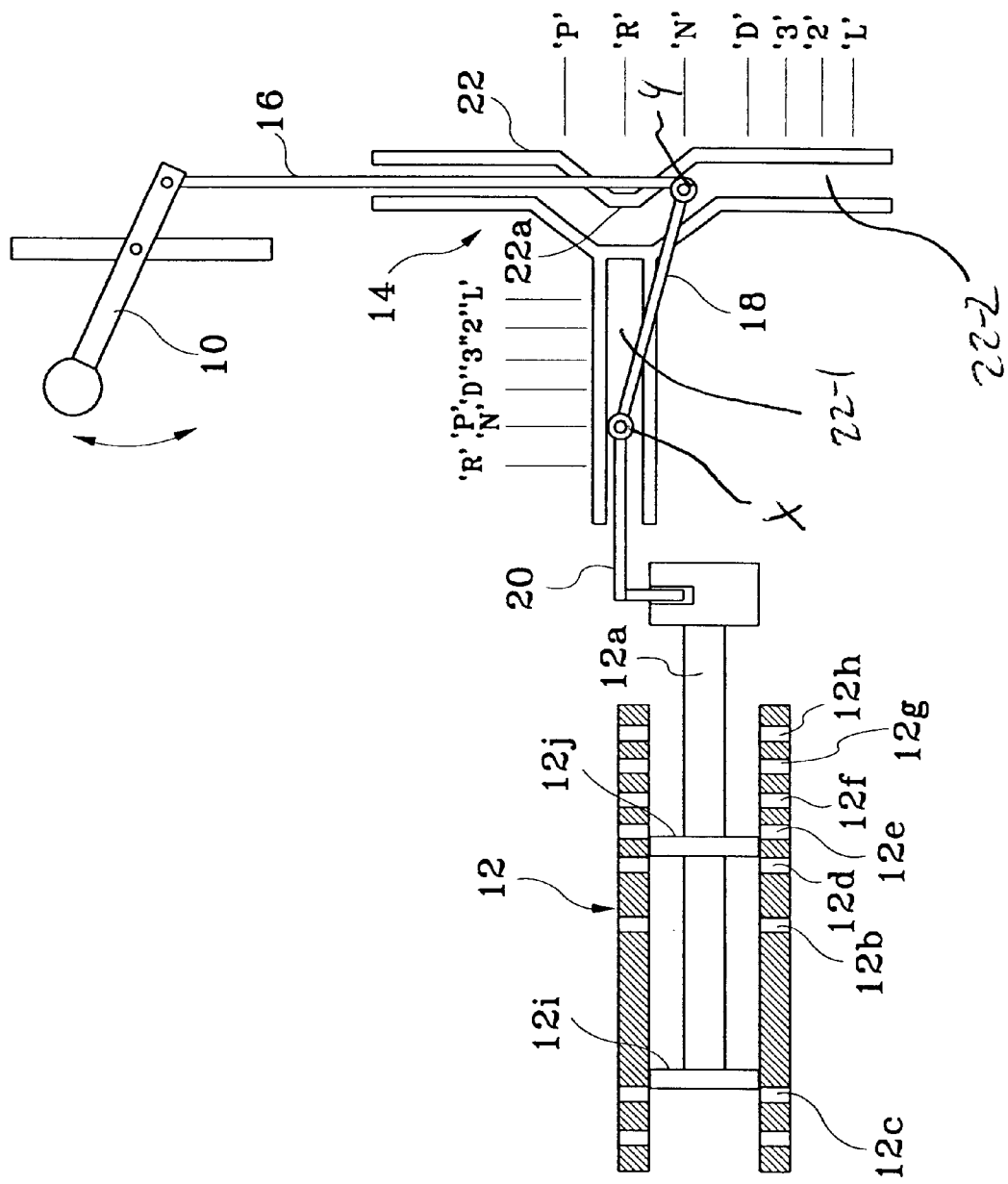
FIG. 4 is a schematic view of a shift manipulating apparatus of an automatic transmission, illustrating a state where a shift lever is positioned at range N, in accordance with the present invention.

As shown in FIG. 4, when the shift lever is positioned at range N, operation of linkage means 14 is accomplished as described above, and the appropriate ports are interconnected to form an oil path for range N according to the movement of the spool 12a in the manual valve 12. All the relevant steps are the same as those at the time of a range shift to range P as shown in FIG. 2. In other words, in the shift manipulating apparatus of the present invention, the spool 12a of the manual valve 12 is placed at the same position when the shift lever 10 is put at range P as shown in FIG. 2 and at range N as shown in FIG. 4.

According to a further preferred embodiment of the invention, the first and second rods 16, 18 of linkage means 14 form an obtuse angle of 90+α degrees when shift lever 10 is positioned at range P, and an acute angle of 90−α degrees when the shift lever 10 is positioned at range N. Accordingly, connection point (X) between the second and third rods 18, 20 is identically positioned for ranges P and N, and the position of the spool 12a of the manual valve 12 connected to the third rod 20 to receive operational force therefrom becomes identical. As a result, it becomes possible in manual valve 12 to identically design an oil path and port arrangment for both ranges P and N. The same oil path at ranges P and N can be effectively utilized for maintaining the supply of oil pressure to lubricate respective parts of power train, but stopping the supply of oil pressure to clutches and brake, thereby making it possible to simplify the structure of the oil pressure control unit.

As described above, there is an advantage in the shift manipulating apparatus for an automatic transmission of the present invention in that at ranges P and N, where the oil pressure needed not to be supplied to a related frictional element because a vehicle is stopped, the spool 12a can be set at the same position in the manual valve 12 of the valve body even when the shift lever 10 is positioned at different ranges, thereby simplifying the structure of the oil pressure control unit. In addition, if the structure of the oil pressure control unit is simplified in the aforementioned automatic transmission, it is possible to make reductions in the processing steps of parts and in manufacturing cost.

What is claimed is:

1. A shift manipulating apparatus for an automatic transmission, including at least drive (D), park (P) and neutral (N) gear ranges, comprising:
    a shift lever to receive shift range selection manipulating force from a driver;
    a manual valve to control oil pressure of the automatic transmission; and
    linkage means for connecting the shift lever and a spool of the manual valve to enable the spool of the manual valve to identically form an interconnection of ports in the manual valve for both ranges P and N.

2. The apparatus, as defined in claim 1, wherein the linkage means comprises: a first rod connected to the shift lever, a third rod connected to the spool of the manual valve, a second rod pivotally interconnected between the first and third rods at second and first connection points, respectively, a second guide to guide the second-connection point along a straight line movement path substantially in parallel with the spool of the manual valve and a first guide to guide the first connection point to be spaced apart the same distance from the manual valve at ranges P and N.

3. The apparatus, as defined in claim 2, wherein the second guide forms a second movement path substantially perpendicular to the movement path formed by the first guide, and a protruder is formed in the second movement path to enable the second connection point to move to symmetric positions at ranges P and N.

4. The apparatus, as defined in claim 2, wherein the first and second guides are made in a shape of a letter "T".

5. The apparatus, as defined in claim 1, wherein the manual valve includes
    valve spool within a valve body, the body defining a plurality of ports, comprising:
        an input port for receiving operational oil with line pressure from a regulator valve through an oil pump;
        a supply port for supplying the line pressure to a related frictional element at range R;
        a supply port for supplying the line pressure to a related frictional element at any other range than range R;
        a supply port for supplying the line pressure to a related frictional element at range D;
        a supply port for supplying the line pressure to a related frictional element at range 3;
        a supply port for supplying the line pressure to a related frictional element at range 2; and
        a supply port for supplying the line pressure to a related frictional element at range L, and wherein the spool comprises first and second lands for supplying line pressure only to selected related frictional element in response to range shifts.

6. A shift manipulating apparatus for an automatic transmission, wherein the transmission includes at least drive, reverse, neutral and park gear ranges, said apparatus comprising a gear shift mechanism cooperating with a manual valve, wherein;
    the manual valve includes identical hydraulic port positions for both the neutral and park gear ranges, and
    the gear shift mechanism comprises:
        a shift lever;
        a first linkage member having a first end operatively linked to the shift lever, and a second end;
        a second linkage member having a first end operatively linked to the first linkage member second end at a second connection point, and a second end; and
        a third linkage member having a first end operatively linked to the second linkage member second end at a first connection point, and a second end operatively linked to the manual valve;
        wherein said first connection point is guided to be equally spaced from the manual valve in both the neutral and park gear ranges.

7. The apparatus according to claim 6, wherein said first connection point, in the reverse gear range, is guided to a position between the neutral and park gear ranges and spaced closer to the manual valve than in the neutral or park gear ranges.

8. The apparatus according to claim 6, wherein:
    said manual valve comprises a valve body defining said ports and a valve spool movable within said body to select ports corresponding to the selected gear range;
    said third linkage member is linked to the valve spool; and
    said first connection point is guided to move at least substantially parallel to movement of the valve spool.

9. The apparatus according to claim 8, further comprising a guide member including a first channel carrying the first connection point and a second channel carrying the second connection point.

10. The apparatus according to claim 9, wherein the wherein:
    said first channel is at least substantially perpendicular to said second channel; and
    said second channel includes raised portion corresponding to the reverse gear range position, said raised portion positioning the second connection point closer to the manual valve than when in the park or neutral gear range positions.

* * * * *